Figure 1:
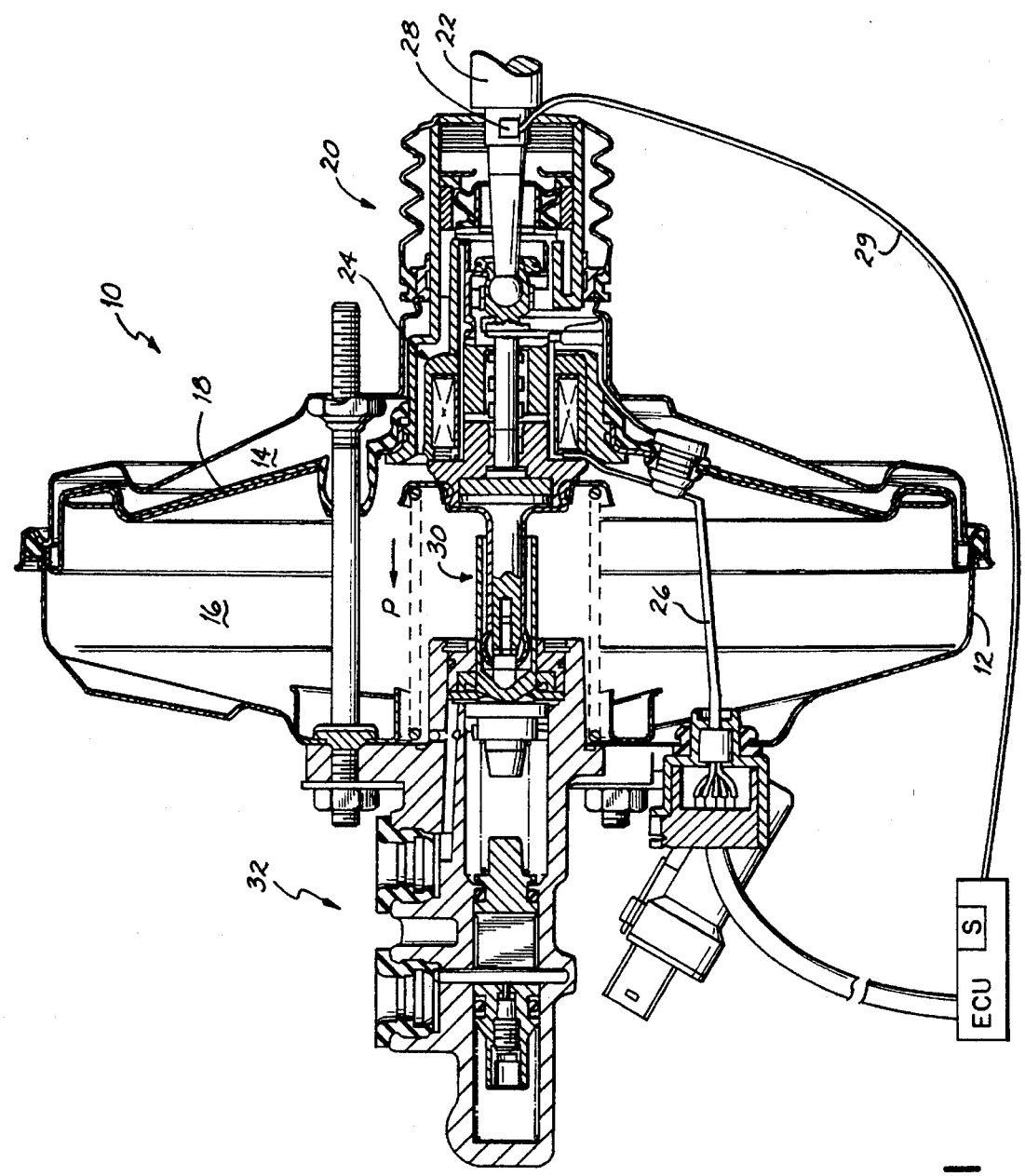

United States Patent [19]
Heibel

[11] Patent Number: 5,590,937
[45] Date of Patent: Jan. 7, 1997

[54] ELECTRONICALLY CONTROLLED VEHICLE BRAKING SYSTEM AND METHOD FOR OPERATING SAME

[75] Inventor: Helmut Heibel, Moschheim, Germany

[73] Assignee: Lucas Industries public limited company, United Kingdom

[21] Appl. No.: 533,011

[22] Filed: Sep. 25, 1995

[30] Foreign Application Priority Data

Oct. 14, 1994 [DE] Germany .......................... 44 36 819.4

[51] Int. Cl.$^6$ .................................. B60T 13/66
[52] U.S. Cl. .................. 303/125; 303/113.4; 303/114.3; 303/3; 303/155; 188/356
[58] Field of Search ............................... 303/125, 113.4, 303/114.3, 113.3, 113.2, 126, 113.1, 167, 155, 139, 198, 22.1, 15, 18, 20, 3; 180/167–169; 364/426.01, 426.02, 426.03, 426.04; 188/356, 357; 60/547.1; 91/376 R

[56] References Cited

U.S. PATENT DOCUMENTS

| | | | |
|---|---|---|---|
| 4,505,351 | 3/1985 | Nishikawa et al. | 303/114.3 |
| 5,158,343 | 10/1992 | Reichelt et al. | 303/113.4 |
| 5,169,215 | 12/1992 | Takata | 303/113.2 |
| 5,350,224 | 9/1994 | Nell et al. | 188/356 |
| 5,350,225 | 9/1994 | Steiner et al. | 303/113.4 |
| 5,372,409 | 12/1994 | Farr | 303/12 |
| 5,445,444 | 8/1995 | Rump et al. | 303/125 |
| 5,447,363 | 9/1995 | Fukamachi | 180/169 |
| 5,505,526 | 4/1996 | Michels | 303/3 |

FOREIGN PATENT DOCUMENTS

| | | |
|---|---|---|
| 4028290 | 1/1992 | Germany . |
| 4102496 | 2/1992 | Germany . |

*Primary Examiner*—Douglas C. Butler
*Attorney, Agent, or Firm*—Wood, Herron & Evans, P.L.L.

[57] ABSTRACT

The invention relates to an electronically controlled vehicle braking system with a brake booster comprising an electromagnetically operable control valve arrangement, an electronic control device supplying the control valve arrangement with control signals for initiating or cancelling an automatic braking sequence, and a load sensor connected with the electronic control device for sensing the pedal actuation force acting upon a brake pedal coupled with the brake booster, characterized in that the electronic control device is adapted to effect a brake pressure relief depending upon a reduction of the pedal actuation force acting on the brake pedal after the initiation of an automatic braking sequence.

14 Claims, 2 Drawing Sheets

ELECTRONICALLY CONTROLLED VEHICLE BRAKING SYSTEM AND METHOD FOR OPERATING SAME

DESCRIPTION

The invention relates to an electronically controlled vehicle braking system with a brake booster comprising an electromagnetically operable control valve arrangement, an electronic control means (ECU) supplying the control valve arrangement with control signals for initiating or cancelling an automatic braking sequence, and a load sensor being connected with the electronic control means (ECU) for sensing the pedal actuation force acting upon a brake pedal coupled with the brake booster.

Such an arrangement is known from DE 40 28 290 C1, where the actuation speed caused by the driver is used as the sole criterion for initiating an automatic braking sequence. Here the actuation speed of the brake pedal in its respective position, as imparted by the driver, is compared with a fixed threshold value, and depending upon the comparison result, an emergency braking is initiated or not. With this known method, in order to terminate the emergency braking, a change in the direction of the acutation speed of the brake pedal is used as criterion for the termination of the emergency braking.

The measurement of the actuation speed of the brake pedal, however, requires a measurement of the pedal actuation travel followed by a differentiation of the measured travel by the time. The same applies to the detection of the direction reversal. This means that a driver must ease the brake pedal load so that it moves through a predetermined travel (in a certain period of time). The consequence is that the actual intention of the driver to end the emergency braking can be detected by the electronic control unit and transferred into the appropriate action only after the brake pedal has returned by the predetermined length of travel. This results in a time delay before the actual end of the emergency braking.

From DE 41 02 496 A1 a brake pressure control means is known which measures the force acting on the brake pedal or the directly correlated magnitude of the brake pressure produced in the hydraulic braking circuit in order to block the braking circuit in which the increased brake pressure was measured upon exceeding a threshold value. In this document, however, only the initiation of a power assisted emergency braking is described. Criteria for terminating the emergency braking or for a change of the emergency braking to a directed braking are not described therein.

As per definition, an emergency braking is characterized in that the brake booster, regardless of the actual brake pedal actuation, produces the maximum possible brake pressure in the hydraulic system in order to bring the vehicle to a standstill within the shortest possible distance. Directed braking means the pedal actuation dependent control of the brake booster in order to achieve a braking of the vehicle as defined and controlled by the driver via the brake pedal.

The invention is therefore based on the object to provide a possibility for detecting the driver's intention to change from an emergency braking to a directed braking or to end an emergency braking in a manner as reliable and delay-free as possible.

To solve this object, the initially described electronically controlled vehicle braking system is further developed by an electronic control means which is adapted to effect a cancellation of the automatic braking depending upon a reduction of the pedal actuation force acting on the brake pedal after the initiation of an automatic braking sequence.

The invention is based on the unexpected observation that the reduction of the pedal actuation force acting on the brake pedal can be sensed and evaluated with a considerably shorter time delay as compared to a measurement of the decrease in the pedal actuation speed, so that the driver's intention can be complied with more directly.

In order to detect the driver's intention to cancel the automatic braking sequence as reliably as possible, the vehicle braking system according to the invention is adapted to cancel the braking upon reaching a predetermined threshold value of the pedal actuation force applied to the brake pedal.

In a preferred embodiment, signals received from the load sensor are permanently sensed, converted into data values in the electronic control means, and stored in a memory associated to the electronic control means. From the stored data, a data value reached immediately prior to an initiation of an automatic braking sequence is established as the momentary threshold value. Upon a reduction of the data values, which have been converted from the sensed signals after the initiation of the automatic braking sequence, to the momentary threshold value, the cancellation of the automatic braking sequence is effected.

In order to achieve said cancellation comfortably, i.e. without jerky movements of the vehicle, the momentary actuation force acting on the brake pedal is preferably used as a criterion for the brake power to be applied to the vehicle brakes for the cancellation of the automatic braking sequence. A decrease of the brake power to be applied to the vehicle brakes from the brake power being applied during automatic braking to the brake power as specified by the actual brake pedal actuation is achieved within a predetermined period of time, in order to rapidly comply with the driver's intention, on the one hand, and to enable a smooth brake power boost rate via the brake pedal, on the other hand.

The predetermined period of time is preferably established as a function of the momentary vehicle velocity, the vehicle deceleration, or the pedal actuation force. The momentary vehicle velocity or the vehicle deceleration can be measured by the other sensors, and corresponding measured values can be supplied to the electronic control means.

With the reduction of the brake power to be applied to the vehicle brakes from the brake power being applied during automatic braking to the brake power as specified by the actual brake pedal actuation being made proportionally to the momentary brake pedal actuation force, it is possible to achieve a pedal proportional reduction of the booster power of the brake booster so that the braking operation is brought back comfortably to the normal level without an emergency braking interference.

The method according to the invention for operating an electronically controlled vehicle braking system provides for sensing an actuation force which is applied to a brake pedal coupled to a brake booster comprising an electromagnetically operable control valve arrangement. An automatic braking sequence is initiated upon compliance with a predetermined criterion. The cancellation of the automatic braking sequence is effected as soon as a decrease of the pedal acutation force occurs.

The cancellation of the automatic braking sequence will be initiated as soon as a decrease of the pedal actuation force by a predetermined value occurs.

During operation, the pedal actuation force is sensed permanently, and the value of the pedal actuation force immediately prior to the initiation of an automatic braking is established as the momentary threshold value. The automatic braking is cancelled as soon as a reduction of the pedal actuation force as sensed after the initiation of the automatic braking to the momentary threshold value is detected.

For the cancellation of the automatic braking sequence, the momentary actuation force acting on the brake pedal is evaluated as the criterion for the brake power to be applied to the vehicle brakes.

The reduction of the brake power to be applied to the vehicle brakes from a brake power being effective during automatic braking to the brake power specified by the pedal actuation is achieved during a predetermined period of time. Said reduction can also be established as a function of the momentary vehicle velocity, vehicle deceleration, or brake pedal actuation force.

In a preferred embodiment the reduction is effected proportional to the momentary brake pedal actuation force.

Figure 2:
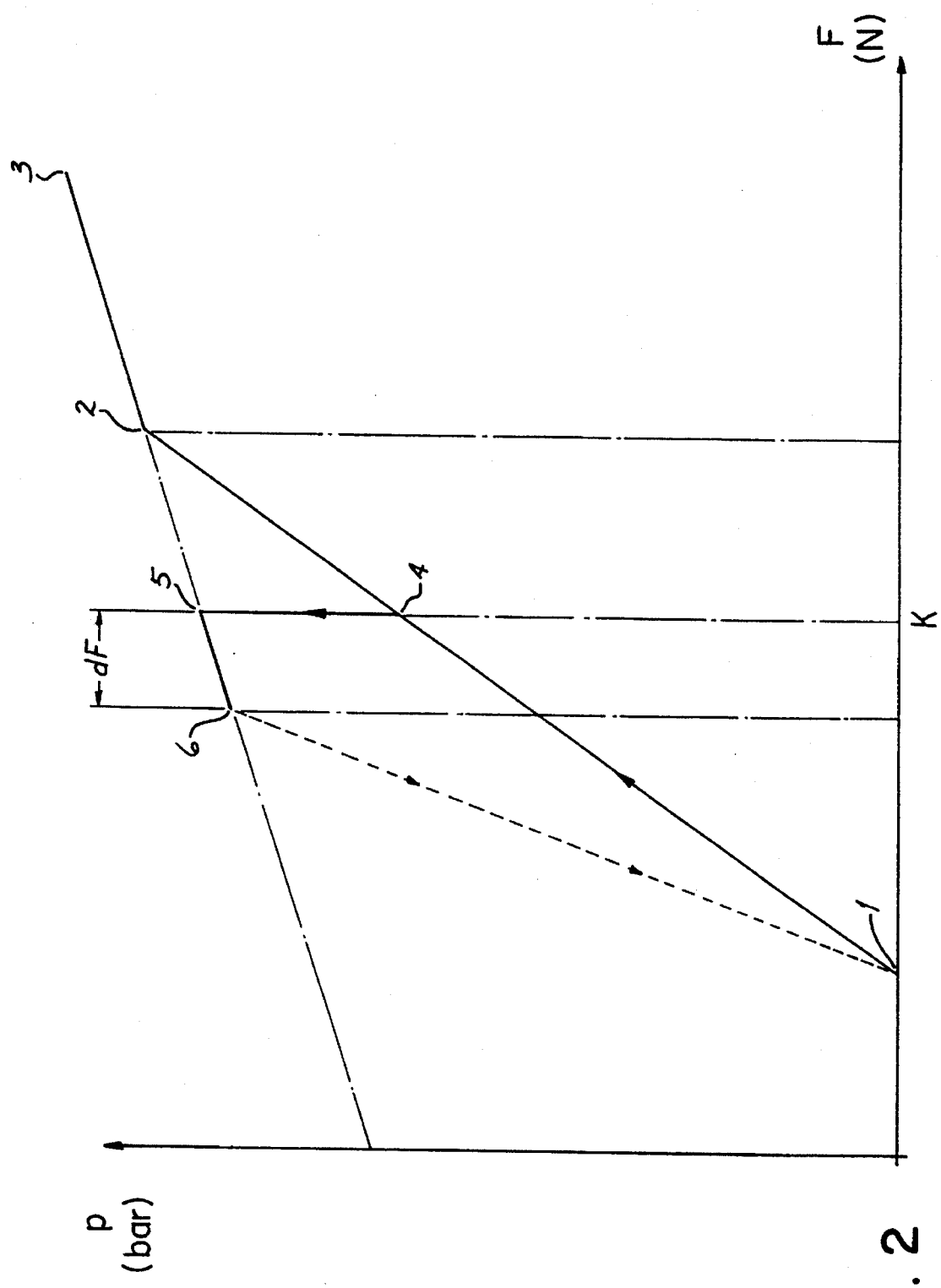

Further properties, details and advantages of the invention will be explained below with reference to the accompanying drawings, in which:

FIG. 1 shows a schematic side view of an electronically controlled brake booster of a vehicle braking system according to the invention; and FIG. 2 shows a diagram of the pressure gradient in the hydraulic braking system as a function of the pedal actuation force during automatic braking.

FIG. 1 illustrates an overall layout of a brake booster of a vehicle braking system. A brake booster 10 shown comprises an essentially rotation symmetrical housing 12, in which a rear chamber 14 and a front chamber 16 are arranged and separated from each other by a movable wall 18. A control valve arrangement 20 being associated with the brake booster 10 is coupled with the movable wall 18 for a common relative movement with respect to the housing 12. The front end of a rod-shaped actuation member 22, which in the installed condition is coupled with a brake pedal (not shown) of the motor vehicle acts on the valve.

Within the brake booster 10 a power output member 30 is arranged which bears against the control valve arrangement 20. The power output member 30 is provided for the activation of a master cylinder 32.

In the rest position shown with the vacuum source disconnected, an atmospheric pressure prevails in both chambers 14 and 16. With the vacuum source connected, i.e. for example, with the motor running, the inlet pipe of which is connected with the front chamber 16, a vacuum is built up in the front chamber 16 so that the movable wall 18 together with the valve is slightly displaced in a forward direction. Thereby a new pressure balance is achieved between the two chambers 14 and 16. From this ready position, a lost travel free activation of the brake booster is ensured.

Upon a normal brake actuation by the driver, the brake booster 10 operates in a usual manner by interrupting the connection between the two chambers 14 and 16 via the valve and admitting ambient air into the rear chamber 14. Consequently, an actuation force augmented by the brake booster 10 is available at the power output member 30.

The control valve arrangement 20 can be actuated by an electromagnet 24 in such a manner that the control valve arrangement 20 is either activated by the electromagnet 24 only or, additionally to an actuation via the brake pedal, through an actuation member 22. For this purpose, the electromagnet 24 is connected to the electronic control means ECU via a line 26. A load sensor 28 is provided at the actuation member 22, which is also connected to the electronic control means via a line 29.

The load sensor 28 can be realized as a strain gauge or a pressure sensor.

It is decisive that the load sensor 28 is arranged at a location where the measured force (and its time dependent variation) still coincides as close as possible with the force applied by the driver to the brake pedal (not shown). This means that multiple reversal, stepping-up etc. of the force prior to its measurement have to be avoided.

As the load sensor a sensor can be used as it is described in P 43 00 995.6, for example. If the driver actuates the brake pedal with a certain force increase rate or a certain brake pedal actuation speed, then this is sensed by the electronic control means ECU (e.g. by the load sensor 28), and a release signal is sent via the line 26 to the electromagnet 24. This signal causes a displacement of the control valve arrangement 20 so that ambient air can flow into the chamber 14. This results in a movement of the movable wall 18 in the sense of a decrease in volume of the chamber 16, thereby displacing the power output member 30 in the direction of an arrow P. The actuation force thus applied to the master cylinder 32 is independent of the force momentarily still acting on the brake pedal or the actuation member 22, respectively. The activation of the electromagnet 24 rather causes an unhindered and rapid actuation of the vehicle brakes with the maximum possible hydraulic pressure.

FIG. 2 illustrates the course of a braking sequence under automatic braking. Starting from the point 1 in FIG. 2, both the force (applied by the driver) acting on the actuation member 22 as well as the boost generated by the brake booster 10, cause the steep pressure increase of the pressure p in the hydraulic pipes to the vehicle brakes. The maximum possible pressurization achievable by the brake booster 10 is reached in a point indicated by reference numeral 2 in FIG. 2. A further increase (up to point 3) is only possible through continuously actuating the brake pedal, with only the force applied by the driver causing another increase of the pressure p. The brake booster is no longer involved.

The operation of the electronically controlled vehicle braking system according to the invention is as follows:

At the beginning of an actuation of the brake pedal (point 1 in FIG. 2), the pressure in the hydraulic braking system increases relatively steeply because the force applied by the driver to the brake pedal is linearly augmented by the brake booster 10. Upon reaching the point 4 in FIG. 2, the electronic control unit ECU activates the electromagnet 24 via the line 26 so that the brake booster is automatically activated for performing an emergency braking, which results in a virtually vertical increase of the pressure in the hydraulic braking system up to the point 5 in FIG. 2. In point 5, the driver has two possibilities. He can either continue to increase to force acting on the brake pedal, in which case the pressure in the hydraulic braking system would increase along the broken connecting line between point 5 and 2 toward the point 2 in FIG. 2. If the driver, however, wants to achieve an abortion of the emergency braking, he must decrease the force acting on the brake pedal by an amount dF. This also results in a pressure decrease in the hydraulic braking system to point 6 in FIG. 2. As soon as the value of the force associated with point 6 in FIG. 2 applied to the brake pedal is reached, this is sensed by the electronic control unit ECU via the load sensor 28, and a deactivation of the electromagnet 24 is initiated. This causes a cancellation of the emergency braking and a decrease of the brake pressure to the normal brake boost characteristic (point 1 in FIG. 2) along the broken line between points 6 and 1 in FIG. 2.

The criterion to be met for the initiation of the automatic braking sequence is to reach the point 4 or the associated force value K, respectively. If the pedal actuation force is reduced by a predetermined value dF or if a force value acting on the brake pedal, which was sensed immediately prior to the initiation of the automatic (emergency) braking, is sensed again (point 6 in FIG. 2), then the cancellation of the emergency braking is effected by deenergising the electromagnet 24. The return of the brake booster to the normal booster characteristic (points 1-2-3) can take place differently fast or dependent on the ambient conditions (vehicle deceleration, vehicle velocity or the like).

I claim:

1. An electronically controlled vehicle braking system comprising:

a brake booster (10) having an electromagnetically operable control valve arrangement (20), an electronic control means (ECU) supplying the control valve arrangement (20) with control signals for initiating or cancelling an automatic braking sequence, a load sensor (28) connected with the electronic control means (EUC) for sensing the pedal actuation force acting upon a brake pedal coupled with the brake booster (10), and the electronic control means (ECU) adapted to effect a brake pressure relief depending upon a reduction of the pedal actuation force acting on the brake pedal after the initiation of an automatic braking sequence, and to use the pedal actuation force acting on the brake pedal as a criterion for the brake power to be applied to the vehicle brakes upon cancellation of the automatic braking sequence.

2. An electronically controlled vehicle braking system according to claim 1, characterized in that the electronic control means (ECU) is adapted to effect the cancellation of the braking upon reaching a predetermined threshold value of the pedal actuation force acting on the brake pedal.

3. An electronically controlled vehicle braking system comprising:

a brake booster (10) having an electromagnetically operable control valve arrangement (20), an electronic control means (ECU) supplying the control valve arrangement (20) with control signals for initiating or cancelling an automatic braking sequence, a load sensor (28) connected with the electronic control means (ECU) for sensing the pedal actuation force acting upon a brake pedal coupled with the brake booster (10), and the electronic control means (ECU) adapted to effect a brake pressure relief depending upon a reduction of the pedal actuation force acting on the brake pedal after the initiation of an automatic braking sequence; wherein the electronic control means (ECU)

permanently senses signals from the load sensor (28), converts the signals into data values, and stores said data values in a memory (S);

determines from the stored data values a momentary threshold data value obtained immediately prior to initiation of the automatic braking sequence; and from the signals sensed after the initiation of the automatic braking sequence, effects the cancellation of the automatic braking sequence upon a reduction of the converted data values to the momentary threshold value.

4. An electronically controlled vehicle braking system according to claim 3, characterized in that the electronic control means (ECU) is adapted to use the pedal actuation force acting on the brake pedal as a criterion for the brake power to be applied to the vehicle brakes upon the cancellation of the automatic braking.

5. An electronically controlled vehicle braking system according to claim 4, characterized in that the electronic control means (ECU) is adapted to effect a reduction of the brake power to be applied to the vehicle brakes from the brake power applied during the automatic braking to the brake power specified by the actual brake actuation within a predetermined period of time.

6. An electronically controlled vehicle braking system according to claim 5, characterized in that the electronic control means (ECU) is adapted so that the predetermined period of time is established as a function of the momentary vehicle velocity, vehicle deceleration or brake pedal actuation force.

7. An electronically controlled vehicle braking system according to claim 4, characterized in that the electronic control means (ECU) is adapted to effect the reduction of the brake power to be applied to the vehicle brakes from the brake power applied during the automatic braking to the brake power specified by the actual brake actuation proportionally to the momentary brake pedal actuation force.

8. A method for operating an electronically controlled vehicle braking system comprising the following steps:

a) sensing an actuation force applied to a brake pedal which is coupled with a brake booster having an electromagnetically operable control valve arrangement;

b) initiating an automatic braking sequence if a predetermined criterion (K) is met;

c) cancelling the initiated automatic braking sequence upon sensing a reduction of the pedal actuation force; and d) upon said cancelling of the automatic braking sequence, evaluating the pedal actuation force acting on the brake pedal as the criterion for the brake power to be applied to the vehicle brakes.

9. A method for operating an electronically controlled vehicle braking system according to claim 8, where d) the cancellation of the automatic braking sequence is initiated if a reduction of the pedal actuation force by a predetermined value (dF) occurs.

10. A method for operating an electronically controlled vehicle braking system comprising the following steps:

a) sensing an actuation force applied to a brake pedal which is coupled with a brake booster having an electromagnetically operable control valve arrangement;

b) initiating an automatic braking sequence if a predetermined criterion (K) is met, and c) cancelling the initiated automatic braking sequence upon sensing a reduction of the pedal actuation force, wherein a1) the pedal actuation force is permanently sensed and, c1) the value of the pedal actuation force immediately prior to the initiation of the automatic braking sequence is established as a momentary threshold value and, c2) the automatic braking sequence is cancelled if, after initiation thereof, a reduction of the pedal actuation force to the momentary threshold value is sensed.

11. A method for operating an electronically controlled vehicle braking system according to claim 10, where c3) upon the cancellation of the automatic braking sequence the pedal actuation force acting on the brake pedal is evaluated as the criterion for the brake power to be applied to the vehicle brakes.

12. A method for operating an electronically controlled vehicle braking system according to claim 10, where c4) the reduction of the brake power to be applied to the vehicle brakes from the brake power applied during automatic braking to the brake power specified by the pedal actuation is effected within a predetermined period of time.

13. A method for operating an electronically controlled vehicle braking system according to claim 12, where c5) the reduction of the brake power to be applied to the vehicle brakes from the brake power applied during automatic braking to the brake power specified by the pedal actuation is established as a function of the momentary vehicle velocity, vehicle deceleration or brake pedal actuation force.

14. A method for operating an electronically controlled vehicle braking system according to claim 12, where c6) the reduction of the brake power to be applied to the vehicle brakes from the brake power applied during automatic braking to the brake power specified by the pedal actuation is effected proportionally to the momentary brake pedal actuation force.

* * * * *